3,296,214
PIPERIDINE-N-ACETIC ACID MODIFIED POLY-
AMIDES OF IMPROVED DYEABILITY
Oscar A. Pickett, Jr., Chapel Hill, N.C., assignor to
Monsanto Company, a corporation of Delaware
No Drawing. Filed Oct. 10, 1963, Ser. No. 315,400
5 Claims. (Cl. 260—78)

This invention relates to polymeric materials and more particularly to polyamide compositions with improved dyeing properties.

The general class of polymeric substances with which this invention is concerned are synthetic, high molecular weight, polycarbonamides of a general type characterized by the presence of recurring carbonamide groups as an integral part of the polymer chain, wherein such groups are separated by at least two carbon atoms. They are further characterized by high melting point, pronounced crystallinity, and insolubility in most solvents except mineral acids, formic acid and phenols. The polymers are obtained by the self-polymerization of a monoaminomonocarboxylic acid or by reacting substantially equimolecular proportions of a diamine with a dibasic carboxylic acid. The reactions in both instances are generally conducted at elevated temperatures. When a product capable of being formed in the fibers is desired, heating of the reactants is continued until the polyamide has an inherent viscosity of at least 0.4, the inherent viscosity value is being determined according to the formula $$\frac{\text{Log}_e \eta_r}{C}$$

in which $\eta_r$ is a relative viscosity of a dilute solution of polymer in m-cresol in the same units and at the same temperature and C is a concentration in grams of polymer per 100 cc. of solution. The polymers thus obtained have high melting points and can be cold drawn to form strong, highly oriented fibers. Fibers can be produced from these polymers, among other methods, by melt spinning, i.e. by extruding the molten polymer through small orifices. This is followed by a cold drawing operation, that is, stretching the resultant filaments at a temperature below their melting point until they show molecular orientation.

At the temperatures required to spin such polyamides in the molten state (generally 10° to 50° C. above their melting points), they tend to undergo further polymerization. This further polymerization makes it difficult to prepare uniform filaments from the polymer as the filaments first extruded are of a lower molecular weight than those extruded in the other end of the spinning operation. In order to overcome this difficulty, it has been a common practice to use a small excess (generally 0.1 to 5 molar percent) of a mono functional amide-forming compound such as acetic acid in the polyamide-forming reaction mixture. Another method commonly employed is to use a small excess of either the diamine or the dicarboxylic acid when preparing the polyamide. Both procedures give viscosity stabilized polyamides.

Although conventional polyamides of the above-described type possess outstanding properties of great commercial value, their affinity for dyestuffs is generally deficient. Consequently, much effort has been expended in attempts to improve this property with the following approaches receivnig the most attention: (1) attempts to provide the polymer with active dye sites by employing as viscosity stabilizers compounds which will provide basic end groups, and (2) copolymerization with monomers having in their molecular structure basic atoms with a chemical affinity for acids. Neither of these methods has proved satisfactory. The first, because the amount of basicity which can be introduced without substantial sacrifice in molecular weight is extremely limited. The second, because such copolymers generally have low melting points and are of a low order of crystallinity relative to the homopolymer. This results from the fact that dissymmetrical units in the polymer chain disrupt the elements in the chain so that hydrogen bonding is reduced.

Accordingly, an object of the present invention is to provide a new class of polyamides and a process for preparing same.

A further object is to provide polyamides having an excellent receptivity for acid dyestuffs coupled with good thermostability and spinning performance.

A further object is to provide a new method of introducing basicity into polyamides in an amount sufficient to give good acid dye receptivity without deleterious effect on other properties of the polyamide.

A still further object of this invention is to provide polyamide fibers, which dye readily with acid dyes, yet retain the high strength and other excellent properties of fibers made from the homopolymer. Other objects of the invention will be apparent from the description given hereinafter.

These objects are accomplished by heating to reaction temperature a monoaminomonocarboxylic acid or substantially equimolecular proportions of a diamine and dicarboxylic acid in the presence of a viscosity stabilizer consisting of piperidine-N-acetic acid. The piperidine-N-acetic acid may be added to the polyamide-forming reactants in an amount from 0.1 to 2.5 mole percent based on the polyamide-forming composition.

The polyamides referred to above are prepared by either the self-polymerization of a monoaminomonocarboxylic acid or from substantially equimolecular proportions of a diamine and a dicarboxylic acid. Monoaminomonocarboxylic acids which can be self-polymerized yield these polymers according to the general procedure set out above may be represented by the general formula

in which R is a univalent organic radical or hydrogen and R' is a divalent hydrocarbon radical containing at least five carbon atoms. Illustrative examples are 6-aminocaproic acid, 7-aminoheptanoic acid, 9-aminononanoic acid, 11-aminoundecanoic acid, and 17-aminoheptadecanoic acid.

Similarly, diamines which are readily condensed with equimolecular proportions of an appropriate dicarboxylic acid to yield polyamides of this type may be represented by the general formula $H_2N$—R—$NH_2$ where R is a divalent hydrocarbon radical containing two or more carbon atoms, and preferably from 2 to 10. Among the many suitable compounds are ethylenediamine, proplyenediamine, tetramethylenediamine, pentamethylenediamine, hexamethylenediamine, octamethylenediamine, decamethylenediamine, m-xylene diamine, p-xylene diamine, bis-aminoethyl benzene, benzidine, 1,4-diamino cyclohexane, piperazine and 2,5-dimethyl piperazine.

Dicarboxylic acids which are readily condensed with the mentioned diamines may be represented by the general formula HOOCRCOOH in which R is a divalent hydrocarbon radical having a chain length of at least two carbon atoms. These materials are illustrated by sebacic acid, adipic acid, suberic acid, azelaic acid, undecanedioic acid, pimelic acid, brassylic acid, tetradecanedioic acid, octadecanedioic acid, phenylene diacetic acid, terephthalic acid and isophthalic acid, with adipic acid being especially suitable.

In place of the above-noted amino acids, and dicarboxylic acids and diamines, the amide-forming derivatives thereof may similarly be employed to form desirable polymers. Amide-forming derivatives of the amino acids include the ester, anhydride, amide, lactam, acid halide, N-formyl derivative, carbamate, and, in the presence of water, the nitrile. Amide-forming derivatives of the diamines include the carbamate and N-formyl derivative. Amide-forming derivatives of the dicarboxylic acids comprise the mono- and di-ester, the anhydride, the mono- and di-amide and the acid halides.

In practicing the invention, the piperidine-N-acetic acid may be introduced into the polymerization autoclave with the polyamide-forming reactants, which may be in the form of previously uncombined diamine and dicarboxylic acid or as a pre-formed salt. Alternatively, it may be introduced into the autoclave at some later stage after the polymerization reaction has begun.

The same well-known reaction conditions are employed as are used in preparing conventional fiber-forming polyamides. That is, the reactants are heated at a temperature of from 180° C. to 300° C. and preferably from 200° C. to 295° C. until the product has a sufficiently high molecular weight to exhibit fiber-forming properties. This condition is reached when the polymer has an inherent viscosity of at least 0.4, in accordance with the definition of inherent viscosities given hereinabove. The reaction can be conducted at superatmospheric, atmospheric or subatmospheric pressures. Often it is desirable, especially in the last stages of the reaction, to employ conditions, e.g. reduced pressure, which will aid in the removal of the reaction by-products.

For purposes of illustrating the present invention and the advantages obtainable therewith in greater detail, specific examples are presented following, it being understood that they are merely illustrative and are not to be taken as limitative in any sense. In order to demonstrate that polymer molecular weight is not unduly sacrificed by employing the viscosity stabilizer of this invention, relative viscosity measurements are given for each of the examples. Also, for the purpose of illustrating the improvement in dye-receptivity, determinations were made on relative dye-uptake of each of the samples and compared against a control. In the procedure employed, each of the polymer samples were first ground to 20 mesh and then dyed with equal concentrations of the commercial dyestuff New Fast Scarlet 4R (Colour Index 185). The dyeing was continued over a period of two hours in a bath adjusted to pH 3 with lactic acid and maintained at a temperature of 205° F. Following the completion of dyeing, the amount of dye absorbed by each sample was determined by measuring spectrophotometrically the changes in dyebath concentration, i.e., the difference between the original dye concentration in the bath and the dye concentration at equilibrium.

*Example 1*

The following materials were added to an autoclave: 225 g. (0.86 mole) hexamethylene diammonium adipate; 0.5 g. (0.0040 mole) piperidyl acetic acid; and 90 g. (5.0 moles) water. After sealing and purging the autoclave with Seaford grade nitrogen, the system was brought to conditions of 218° C. and 250 pounds per square inch pressure. Steam was removed from the system until the temperature rose to approximately 240° C. The pressure was gradually reduced to atmospheric conditions and the polymer melt was allowed to remain thus for 30 minutes. The melt was then allowed to cool to room temperature. The polymer was white, highly crystalline and produced strong, cold-drawable fibers from the melt. Other properties were:

(1) Relative viscosity (11% solution in 90% formic acid) _____ 38.4
(2) Amine end groups (equivalents per gram) _____ $4.9 \times 10^{-5}$
(3) Melt spinnability _____ Good This polymer was melted and spun. Fiber properties were:

(1) Machine drawability _____ Good
(2) Draw ratio _____times__ 4.5
(3) Tenacity _____g./d__ 3.9
(4) Denier _____ 23.8
(5) Elongation _____percent__ 28

A sample of this polymer was dyed in accordance with the procedure described hereinabove and compared with a control polymer of polyhexamethylene adipamide stabilized with acetic acid. The polyamide stabilized with piperidyl acetic acid absorbed approximately 50 percent more dye than the control sample stabilized with acetic acid.

*Example 2*

This example was identical to Example 1 in preparation. However, the concentration of piperidene-N-acetic acid added to the preparation was increased from 0.45 mole percent to 1.5 mole percent. Properties of this polymer were, in general, the same as those for Example 1. Relative end groups were $8.6 \times 10^{-5}$. Machine drawn fiber (drawn 4.5 times) had the following properties:

(1) Denier _____ 13.2
(2) Tenacity _____g./d__ 4.8
(3) Elongation _____percent__ 22.0

This polymer, as expected, absorbed more dye. That is, it absorbed 2.34 percent of the dyebath concentration as compared with 1.20 percent for a control stabilized with acetic acid, thus showing a 95 percent increase over the control.

The modified synthetic linear polyamides of this invention are of primary interest in the production of yarns and fabrics; however, they may also be employed to advantage in the production of other products where an enhanced receptivity for dyes may be desired, e.g. bristles, films and the like. In preparing these polyamides other modifying agents which may be useful for a particular end product may be added, such as, for example, delusterants, anti-oxidants, plasticizers and others.

As many differing embodiments of this invention may be made without departing from the spirit and scope thereof, it will be understood that the invention is not to be limited by the specific embodiments set forth herein but only by the appended claims.

I claim:

1. A fiber-forming synthetic linear polycarbonamide having recurring amide groups as an integral part of the main polymer chain, and wherein said groups are separated by at least two carbon atoms, which comprises the product obtained by reacting at a temperature between 180° C. and 300° C., a polyamide-forming composition selected from the group consisting of (a) a polymerizable monoaminomonocarboxylic acid, and (b) substantially equimolecular proportions of a dibasic carboxylic acid and a diamine in the presence of piperidine-N-acetic acid in an amount of from 0.1 to 2.5 mole percent based on said polyamide-forming composition.

2. The fiber-forming synthetic linear polycarbonamide as set forth in claim 1, wherein said polyamide-forming composition comprises substantially equimolecular proportions of adipic acid and hexamethylenediamine.

3. The fiber-forming synthetic linear polycarbonamide as set forth in claim 1, wherein said polyamide-forming composition comprises 6-aminocaproic acid.

4. The fiber-forming synthetic linear polycarbonamide as set forth in claim 1, wherein the quantity of said N-piperidyl acetic acid is 0.3 to 1.0 mole percent, based on the polyamide-forming composition.

5. A textile fiber of the polycarbonamide as defined in claim 1.

References Cited by the Examiner
UNITED STATES PATENTS

| | | | |
|---|---|---|---|
| 2,359,833 | 10/1944 | Faris | 260—78 |
| 2,904,536 | 9/1959 | Reith | 260—78 |

WILLIAM H. SHORT, *Primary Examiner.*

H. D. ANDERSON, *Assistant Examiner.*